United States Patent

Luchner et al.

Patent Number: 6,145,574
Date of Patent: Nov. 14, 2000

[54] MANUFACTURING FOR A CAST ENGINE PART HAVING A BEARING ARRANGEMENT SHAPED IN SEVERAL PARTS VIA FRACTURE SEPARATING

[75] Inventors: Clemens Luchner, Baldham; Horst Henkel, Friedensdorf, both of Germany

[73] Assignees: Bayerische Motoren Werke AG, Munich; Fritz Winter Eisengiesserei GmbH & Co. KG, Stadtallendorf, both of Germany

[21] Appl. No.: 09/091,517

[22] PCT Filed: Dec. 7, 1996

[86] PCT No.: PCT/EP96/05484

§ 371 Date: Apr. 6, 1999

§ 102(e) Date: Apr. 6, 1999

[87] PCT Pub. No.: WO97/22812

PCT Pub. Date: Jun. 26, 1997

[30] Foreign Application Priority Data

Dec. 19, 1995 [DE] Germany ............... 195 47 388

[51] Int. Cl.[7] ............... B22C 9/10; B22D 19/10; B23P 15/10

[52] U.S. Cl. ............... 164/11; 29/413; 29/414; 29/888.09; 164/100; 164/108; 164/137

[58] Field of Search ............... 164/9, 10, 11, 164/78, 75, 100, 108, 137; 29/888.09, 413, 414

[56] References Cited

U.S. PATENT DOCUMENTS

| 2,371,399 | 3/1945 | Mantle | 29/413 X |
| 4,860,419 | 8/1989 | Hekman | 29/413 X |
| 4,884,900 | 12/1989 | Pirault et al. | 29/413 X |

FOREIGN PATENT DOCUMENTS

| 0 167 320 | 1/1986 | European Pat. Off. |
| 0 651 166 | 5/1995 | European Pat. Off. |
| 43 32 444 | 3/1995 | Germany |
| 44 13 255 | 10/1995 | Germany |

Primary Examiner—J. Reed Batten, Jr.
Attorney, Agent, or Firm—Evenson, McKeown, Edwards & Lenanhan, P.L.L.C.

[57] ABSTRACT

A core is formed and a prefabricated bearing bore is provided. Two separate projections are provided on the core wherein free projection edges of the two separate projections have a respective shaping radius between $R=0_{mm}$ and $R \leq 0.45_{mm}$. Subsequently indentations are produced in a circumferential area of the bearing bore by the two separate projections on the core wherein the indentations serve as fracture notches. The cast engine part is then formed by casting metal around the core using said fraction notches as incipient crack sites.

21 Claims, 2 Drawing Sheets

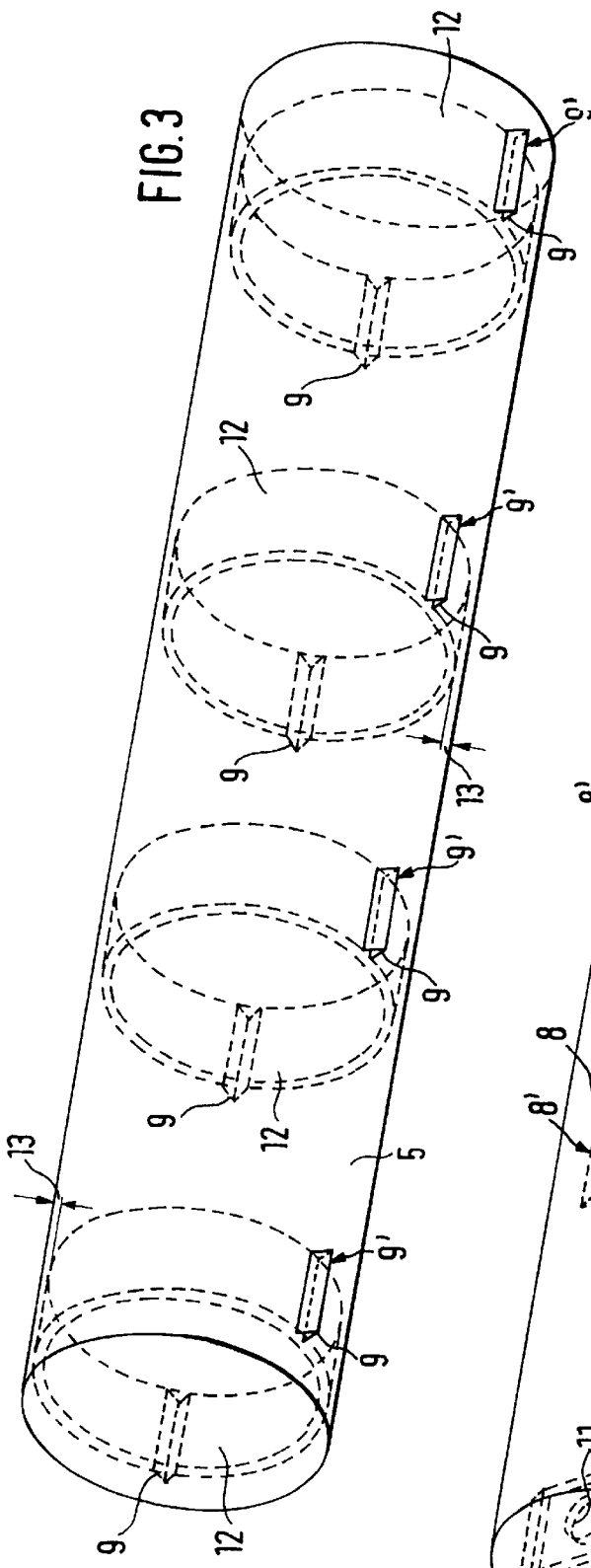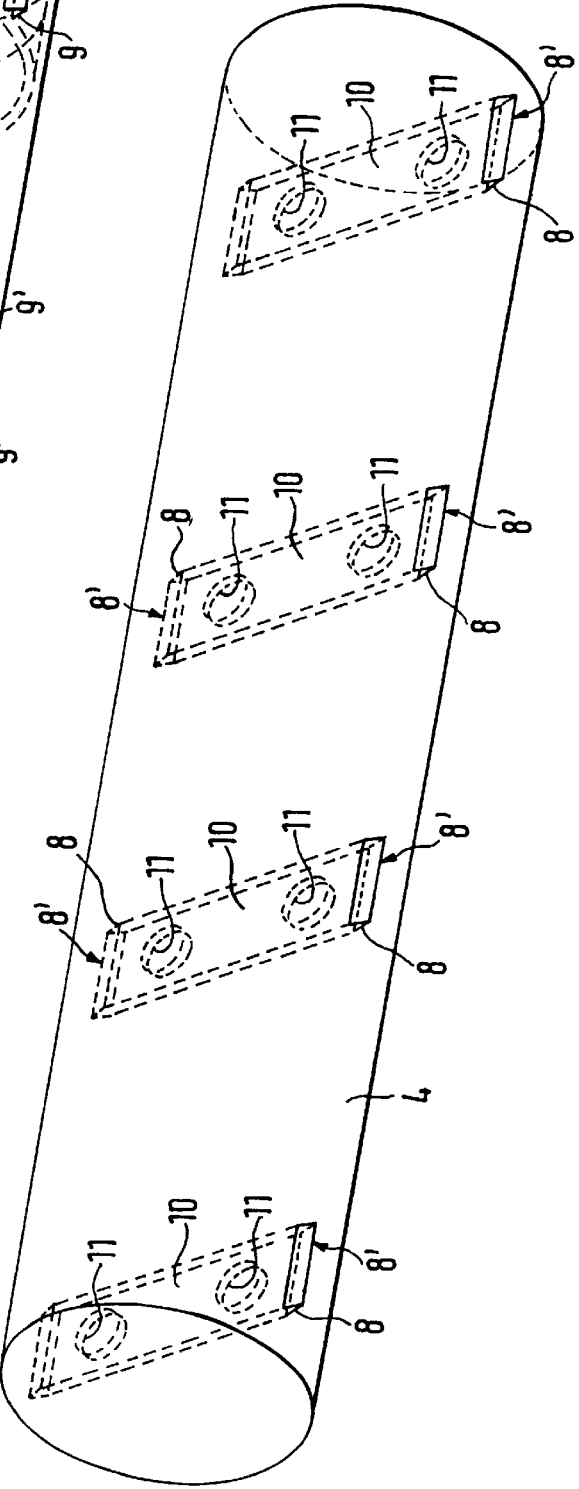

MANUFACTURING FOR A CAST ENGINE PART HAVING A BEARING ARRANGEMENT SHAPED IN SEVERAL PARTS VIA FRACTURE SEPARATING

BACKGROUND AND SUMMARY OF THE INVENTION

A process is provided for making a split bearing assembly that has a saddle-like main body and a removable saddle-like bearing cap secured in end-to-end engagement with a body to define a journal-receiving opening.

A connecting rod and a crankcase of an internal-combustion engine has crankshaft bearings used as cast engine parts. Each of the above-mentioned bearing arrangements comprise a bearing cap formed by fracture separating. As a preparatory measure for a targeted fracture separating, each bearing arrangement in the respective bearing bore also has diametrically arranged, relatively large (macroscopic) fracture separating notches which, according to European Patent Document EP-A 0167320, are preferably produced mechanically but can also be formed by casting or forging.

For a perfect fracture separating via a clear incipient fracture in the base of the separating notch or the indentation, these fracture separating notches require a relatively small point radius (R→0). This explains the high tool wear that results due to fracture separating notches which are produced mechanically.

It is an object of the invention to improve a manufacturing process for a cast engine part with cast-in indentations serving as fracture separating notches such that the desired small point radius is ensured in the notch base of each indentation.

This and other objects and advantages are achieved by the manufacturing process according to the invention, by producing the indentations via separate projections provided on the core. The projections have stably constructed free projection edges. Further, in the area of the notch base of each indentation acting as the incipient crack site, each respective projection has a respective shaping radius between R=0 mm and R<0.45 mm.

In an advantageous embodiment of the invention, the projections which are separate with respect to the core (customary for the shaping-out of the bearing bore) are selected from a stable material (i.e., an iron, a glass, an oxide-ceramic or a salt core). Here, with the selection of the stable material, projections are formed in a wedge shape whose free projection edges (constructed in the manner of blades) each have a radius between R=0 mm and R<0.25 mm. The advantages of the projections which are separate with respect to a core is that they provide exchangeability with a resultant low material cost. A further advantage is their manufacturing/finishing results in a "sharp" projection edge.

In addition, having separate projections offers (as a further advantage) the selection of a material that has a high thermal conductivity (i.e., an iron or a ceramic material). In this case, for the increased dissipation of heat, the projections, in addition to a customary protective core coating in the area of the respective projection edge are covered with a metal oxide coating (preferably a tellurium oxide coating). As a result of this measure, in the case of an engine part formed of a cast iron material, via an increased dissipation of heat due to the tellurium oxide coating in the edge area of each base of each indentation or fracture separating notch (which acts as an incipient crack point), a chilling or a chilled zone can be generated. This chilled zone, because of its hardness, is particularly sensitive to cracks and is therefore advantageously used for forming an incipient crack in the fracture separating plane in the form of a hair crack.

In another embodiment of the invention, to promote ease of handling, wedge-shaped projections of diametrical indentations are formed as end sections of an insert which is arranged to penetrate a respective core. For reasons of cost, the projection are preferably formed of a flat-steel section. This insert is held in a securing manner in a core, such as a sand core, via form closure devices (preferably via openings).

In a further embodiment of the invention, the separate projections are connected with a ring-shaped pressure-resistant insert of a core. The insert ring is reduced in its outside diameter relative to the bearing bore of the respective engine part by an amount corresponding to a thin core sand layer to be applied in a tightly adhering manner.

Particularly, in the case of an engine part which is formed of a cast iron material and has chilled zones in the base of each indentation, this measure makes it possible to produce cracks or hair cracks directed in the fracture separating plane of the bearing arrangement. Because the shrinkage of the respective bearing arrangement in the above-mentioned chilled zones is hindered by the insertion ring in the core, the cracks or hair cracks appear as starter cracks for the fracture separating which follows.

In the case of bearing arrangements which are connected with one another by casting, such as connecting rods cast in a stack or bearing caps of crankshaft bearings of a crankcase which are integrated in a frame, the forced incipient cracks advantageously result in a reduction of tension in the connected bearing caps.

The incipient cracks produced by the so hindered shrinkage additionally facilitate the removal of the respective insert from a bearing arrangement. Here, the removal of the inserts from the indentations is ensured by the consumed coatings.

Other objects, advantages and novel features of the present invention will become apparent from the following detailed description of the invention when considered in conjunction with the accompanying drawings.

BRIEF DESCRIPTION OF THE DRAWINGS

FIGS. 2 and 3 are views of a core for forming the bearing bores in several bearing arrangements with different inserts for forming notches.

DETAILED DESCRIPTION OF THE DRAWINGS

Figure 1:
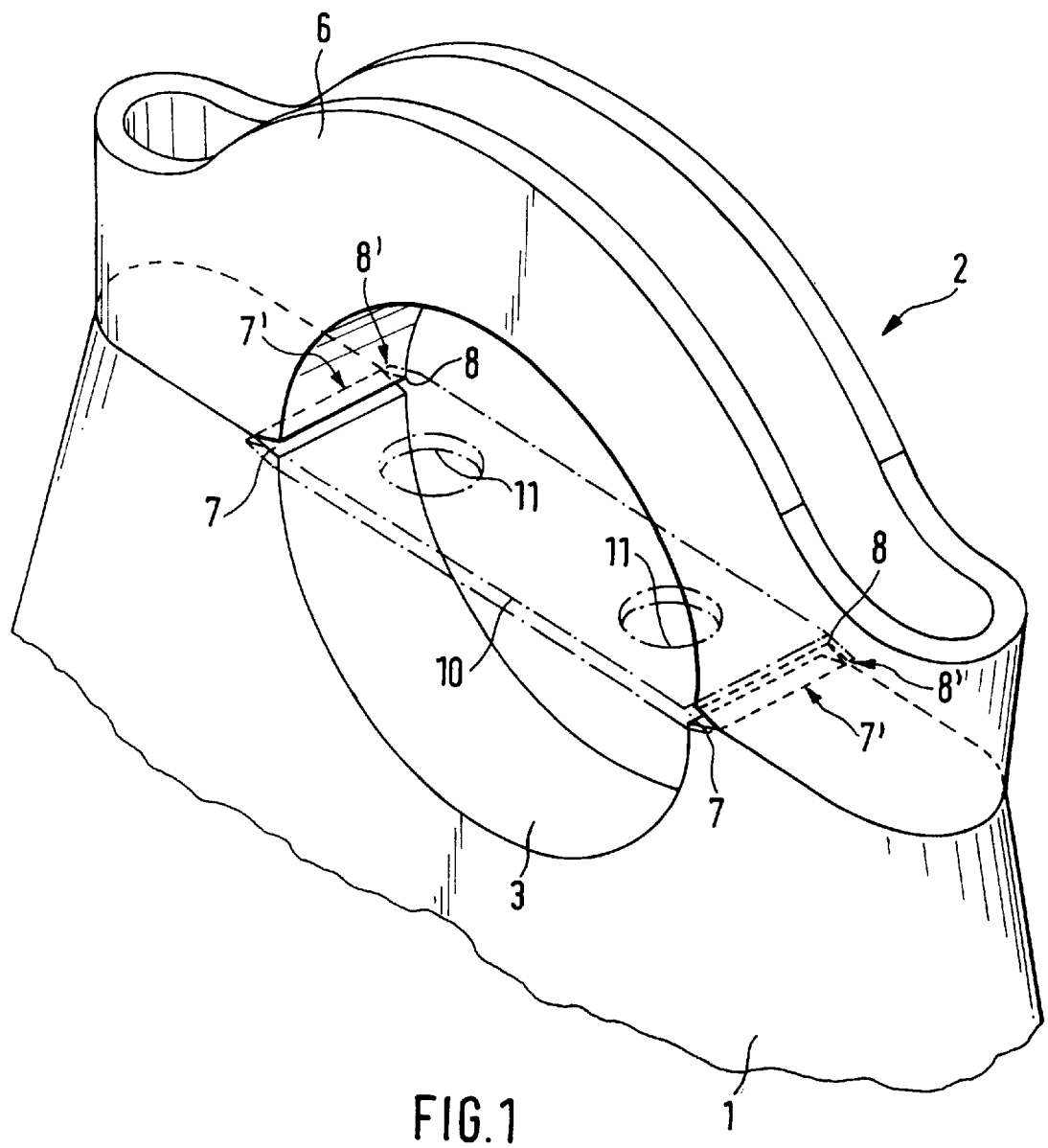
FIG. 1 is a view of a bearing arrangement for a crankshaft bearing in an outlined crankcase of an internal-combustion engine.

A cast crankcase 1 of an internal-combustion engine (shown outlined), comprises mutually aligned bearing arrangements 2 for receiving a crankshaft (not shown). The bearing arrangements 2 comprise one bearing bore 3, respectively, which are prefabricated via a common core 4 or 5 according to FIG. 2 or 3. The bearing arrangements 2 for receiving a crankshaft, are formed in several parts. They are first cast in one piece. The further development of the respective multi-part is achieved via a subsequent fracture separating of a bearing cap 6 from the respective bearing arrangement 2.

For the targeted fracture separation of the bearing cap 6 from the bearing arrangement 2, during the casting of the crankcase 1 with the bearing arrangements 2, an indentation 7 is shaped out in the circumference of each bearing bore 3 in a diametrical manner and is used as an incipient crack. This is described in general, for example, in European Patent Document EP-A 0167320.

The indentations 7 or fracture separating notches for achieving a high fracture quality, which generally are wedge-shaped or V-shaped in their cross-section, must have relatively sharp corners or very small point radii in their notch base 7'.

For overcoming this problem, a manufacturing process for a cast engine part having a bearing arrangement 2 which is formed in several parts via fracture separating and has fracture separation notches or indentations 7 is improved according to the invention such that the indentations 7 are produced via separate projections 8, 9. The separate projections 8, 9 are provided on the core 4 or 5 and have fixedly constructed free projection edges 8', 9'. The free projection edges 8', 9' each have a respective shaping radius between R=0 mm and R<0.45 mm in the area of the notch base 7' of each indentation 7 that operates as the incipient crack site.

The projections 8, 9 constructed separately, relative to the respective core 4 or 5, are advantageously manufactured in a simple manner from a stable material, such as structural steel. Here, the projections 8, 9 (according to FIGS. 1 to 3) have a wedge-shape, blade-type projection edge 8', 9' with a radius of less than 0.25 mm.

In an advantageous embodiment according to the invention, by providing fracture separation notches or indentations 7 shaped in this manner, an engine part made of cast iron material can be improved by introducing, into the fracture that the separate projections 8, 9 are made of, a material having high thermal conductivity (such as structural steel). Moreover, these projections 8, 9, in addition to being provided with a conventional protective core coating (in the area of the respective projection edge 8', 9'), are also covered with a metal oxide coating (particularly a tellurium oxide coating) outside the area of the machining allowance.

As the result of this measure according to the invention, a chilling or a chilled zone is generated via the increased dissipation of heat by the tellurium oxide coating in the edge area of each base 7' of each indentation 7 that operates as an incipient crack site during the fracture separation. As the result of the hardness achieved in this manner in the base 7', the fracture separation notch or indentation 7 becomes susceptible to cracking, whereby, at the start of a fracture separation, hair cracks or starter cracks are generated which extend in the fracture separation plane which is determined by the indentations. This therefore achieves a high fracture quality.

As illustrated in FIG. 2, the wedge-shaped projections 8 in diametrical indentations 7 are constructed as end sections of an insert 10 which is arranged to penetrate the core 4. Here, the insert 10 is manufactured at reasonable cost from a flat-steel section made of structural steel. If the sand core 4 is provided with separate inserts 10, these have form closure devices (preferably several openings 11), which can easily be arranged in the core for securing the bearings, and can be easily filled by the core sand.

An embodiment according to the invention is illustrated in FIG. 3. In this embodiment, the projections 9 are connected with a ring-shaped, pressure-resistant or pressure-stable insert 12 of the core 5. Here, the insert ring 12 is reduced in its outside diameter relative to the bearing bore 3 of the bearing arrangement 2 by an amount corresponding to a thin core sand layer 13 which is to be applied in a firmly adhering manner.

This embodiment of the insert rings 12, which is connected with the separate projections 9 causes incipient cracks or hair cracks directed into the fracture separation plane of the bearing arrangement 2 as starter cracks for the fracture separating which follows. This improvement is possible in the case of a bearing arrangement 2 which is made of a cast iron material and has chilled zones in the base 7' of each fracture separating notch or indentation 7, via the shrinking of the bearing arrangement 2 in these chilled zones which is hindered by the insert rings 12 in a respective core. This measure of the prevented shrinking generates tension-reducing incipient cracks which significantly improve a fracture separation with respect to quality and quantity. Additionally, these incipient cracks facilitate the removal of the insert rings 12 which may be constructed slightly conically on the outer circumference.

The invention is suitable for cast iron and cast light-metal materials. These can be used for piece parts (such as connecting rods), or for complex cast structures (such as crankcases) or even for parts which are integrated with respect to the casting (such as bearing caps in a frame).

What is claimed is:

1. A manufacturing process for manufacturing a cast engine part having a bearing arrangement constructed in several parts through fracture separation, comprising the steps of:

forming a core and providing a prefabricated bearing bore;

providing at least two separate projections on said core wherein free projection edges of said at least two separate projections have a respective shaping radius between $R=0_{mm}$ and $R \leq 0.45_{mm}$;

producing indentations in a circumferential area of said bearing bore by means of said at least two separate projections on the core wherein said indentations serve as fracture notches;

forming the cast engine part by casting metal around the core using said fraction notches as incipient crack sites.

2. The process according to claim 1, further comprising the acts of:

constructing the projections in a wedge shape using a stable material; and constructing the free projection edge as a blade having a radius between R=0 and R≦0.25 mm.

3. The process according to claim 2, wherein the stable material is one of iron, glass, ceramic and salt core.

4. The process according to claim 2, wherein the engine part is made of cast iron material, and wherein a chilling or a chilled zone is generated via an increased dissipation of heat by a tellurium oxide coating in the edge area of each base of the indentation operating as the incipient crack site.

5. The process according to claim 2, wherein the wedge-shaped projections for a diametrical indentation has end sections of an insert arranged to penetrate the respective core, which are constructed from a flat-steel section, and the insert arranged in a core is held in a securing manner via form closure devices.

6. The process according to claim 2, further comprising the acts of:

connecting the projections to a ring-shaped pressure-resistant insert of a core; and reducing an outside diameter ring relative to a bearing bore of the respective engine part to correspond to a thin core sand layer to be applied in a firmly adhering manner.

7. The process according to claim 1, wherein one of connecting rods, and crankcases having crankshaft bearings integrated in a frame are used.

8. The process according to claim 2, further comprising the acts of:

forming the projections from a highly thermally conductive material; and covering the projections in an area of the respective projection edge with a core coating and a metal oxide coating.

9. The process according to claim 8, wherein the projections are made from one of an iron and ceramic material, and the metal oxide coating is a tellurium oxide coating.

10. The process according to claim 8, wherein the wedge-shaped projections for a diametrical indentation has end sections of an insert arranged to penetrate the respective core, which are constructed from a flat-steel section, and the insert arranged in a core is held in a securing manner via form closure devices.

11. The process according to claim 8, further comprising the acts of:

connecting the projections to a ring-shaped pressure-resistant insert of a core; and reducing an outside diameter ring relative to a bearing bore of the respective engine part to correspond to a thin core sand layer to be applied in a firmly adhering manner.

12. The process according to claim 1, wherein the engine part is made of cast iron material, and wherein a chilling or a chilled zone is generated via an increased dissipation of heat by a tellurium oxide coating in the edge area of each base of the indentation operating as the incipient crack site.

13. The process according to claim 12, wherein one of connecting rods, and crankcases having crankshaft bearings integrated in a frame are used.

14. The process according to claim 1, wherein the engine part is formed of a cast iron material and has chilled zones in a base of each indentation, and via the shrinking of the respective bearing arrangement in the chilled zones hindered by the insert rings in the core, cracks or hair cracks are formed directed into the fracture separating plane of the bearing arrangement, as starter cracks for the fracture separating which follows.

15. The process according to claim 14, wherein one of connecting rods, and crankcases having crankshaft bearings integrated in a frame are used.

16. A process for manufacturing a cast engine part having fracture notches, comprising the steps of:

forming a core with at least one separate projection located on the core;

providing said at least one separate projection with a corresponding at least one free projection edge having a respective shaping radius between $R=0_{mm}$ and $R \leq 0.45_{mm}$; and forming the cast engine part by casting metal around the core wherein said at least one separate projection forms fracture notches operating as incipient crack sites.

17. The process according to claim 16, further comprising the act of:

coating an edge area of each base of the fracture notches with a tellurium oxide coating to cause an increased dissipation of heat a and thereby form one of a chilling zone and a chilled zone using an increased dissipation of heat.

18. The process according to claim 16, further comprising the acts of:

constructing the at least one projection edge in a wedge shape using a stable material; and constructing the at least one free projection edge as a blade having a radius between $R=0$ and $R \leq 0.25$ mm.

19. The process according to claim 18, wherein the stable material is one of iron, glass, ceramic and salt core.

20. The process according to claim 18, further comprising the acts of:

forming the at least one projection edge from a highly thermally conductive material; and covering the projections in an area of the respective projection edge with a core coating and a metal oxide coating.

21. The process according to claim 20, wherein the at least one projection edge is made from one of an iron and ceramic material, and the metal oxide coating is a tellurium oxide coating.

\* \* \* \* \*